United States Patent [19]

Martorella et al.

[11] Patent Number: 4,797,829
[45] Date of Patent: Jan. 10, 1989

[54] FLIGHT CONTROL OPTIMIZATION SYSTEM FOR MULTI-CONTROL SURFACE AIRCRAFT

[75] Inventors: Romeo P. Martorella, Dix Hills; Jimmie Chin, Flushing, both of N.Y.

[73] Assignee: Grumman Aerospace Corporation, Bethpage, N.Y.

[21] Appl. No.: 940,454

[22] Filed: Dec. 11, 1986

[51] Int. Cl.[4] .............................................. G05B 11/42
[52] U.S. Cl. .................................. 364/434; 364/433; 318/584; 244/177
[58] Field of Search ............... 364/434, 427, 428, 433; 244/183, 191, 3.21, 3.23, 181; 318/584, 616

[56] References Cited

U.S. PATENT DOCUMENTS

| | | | |
|---|---|---|---|
| 2,934,688 | 4/1960 | Hearther et al. | 318/286 |
| 3,030,054 | 4/1962 | Lee et al. | 244/192 |
| 3,386,689 | 6/1968 | Parker et al. | 244/189 |
| 3,409,251 | 11/1968 | Lawson et al. | 244/178 |
| 3,549,108 | 12/1970 | Smith | 244/194 |
| 3,694,633 | 9/1972 | Lejon | 364/181 |
| 3,710,086 | 1/1973 | Lahde et al. | 318/561 |
| 3,807,666 | 4/1974 | Devlin | 344/194 |
| 3,940,594 | 2/1976 | Bleak et al. | 364/181 |
| 3,946,968 | 3/1976 | Stallard | 244/3.21 |
| 4,030,011 | 6/1977 | Hendrick et al. | 318/561 |
| 4,054,254 | 10/1977 | Cole | 244/3.21 |
| 4,148,452 | 4/1979 | Niessen et al. | 244/195 |
| 4,161,300 | 7/1979 | Schwaerzler et al. | 244/45 A |
| 4,188,570 | 2/1980 | Masters et al. | 318/648 |
| 4,313,165 | 1/1982 | Clelford et al. | 364/424 |
| 4,390,942 | 6/1983 | de Keizer | 364/162 |
| 4,420,808 | 12/1983 | Diamond et al. | 364/434 |
| 4,425,614 | 1/1984 | Barron et al. | 364/158 |
| 4,598,888 | 7/1986 | Béteille | 244/76 R |
| 4,617,633 | 10/1986 | McAllister | 364/434 |
| 4,697,768 | 10/1987 | Klein | 244/191 |
| 4,735,085 | 4/1988 | Meyer | 73/147 |

Primary Examiner—Gary Chin
Assistant Examiner—Thomas G. Black
Attorney, Agent, or Firm—Pollock, VandeSande & Priddy

[57] ABSTRACT

A flight control system utilizing multi-controlled surfaces to provide the necessary control power and feedback logic to stabilize the aircraft with minimal noise amplification. In addition, a unique performance optimization loop is integrated into the stability logic to position the multi-control surfaces for optimum maneuver performance.

10 Claims, 3 Drawing Sheets

FLIGHT CONTROL OPTIMIZATION SYSTEM FOR MULTI-CONTROL SURFACE AIRCRAFT

FIELD OF THE INVENTION

The present invention relates to flight control systems, and more particularly to the use of multi-control surfaces to provide system stability and optimized performance in a multi-control aircraft which is basically unstable.

BACKGROUND OF THE INVENTION

Modern aircraft designs can include unstable airframe configurations such as the X-29 aircraft and can include multi-control surfaces utilized for the foregoing function. Due to the location of the center of gravity of such an aircraft, there is inherent instability which must be carefully attended to by a computer-aided flight control system. Feedback in the flight control system is provided with normal acceleration and pitch rate parameters, derived from accelerometers and gyros. This feedback data is supplied to a servo system which is intended to stabilize the aircraft.

In multi-control surface high performance aircraft such as the canard-equipped X-29, the craft is inherently unstable, and dependence upon conventional flight control system technology has raised the problems of attaining stability margin while minimizing the sensitivity of the flight control system to noise. At high operational speeds, these factors detract from the effectiveness of such an aircraft.

BRIEF DESCRIPTION OF THE PRESENT INVENTION

A flight control system for stabilizing such an aircraft is disclosed utilizing multi-control surfaces to provide the necessary control power and a feedback logic to stabilize the aircraft with minimal noise amplification. In addition, a unique performance optimization loop is integrated into the stability logic to position the multi-control surfaces for optimum maneuver performance. The strake, flap and canard control surfaces of the aircraft are driven by an error signal which is comprised of a pilot stick command signal and feedback components including measured vertical acceleration and pitch rate of the aircraft and a third feedback component derived from a complementary filter. The filter has a high-pass filter section which operates upon canard position data and a low-pass filter section which operates upon pitch rate. A summation of the signals passing both filtering sections is summed with the vertical acceleration and pitch rate feedback signals to form a combined feedback signal. As a result, the stability margin of an inherently unstable aircraft is increased; while noise effects are kept to a minimum.

This invention has as its main function the purpose of stabilizing a basically unstable multi-control surface aircraft. Once stability is achieved for such an aircraft, it is important to maximize the performance which is also a main objective of this invention. This is achieved by adding a separate feedback loop between the input actuators of the multi-control surfaces and the outputs from control surface sensors. Look-up tables are incorporated in the feedback loop for generating error signals as a function of Mach, altitude and angle of attack. The result is a smaller and lighter, more efficient, aircraft thay may be fabricated at reduced costs with the attendant advantage of more efficient fuel consumption.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
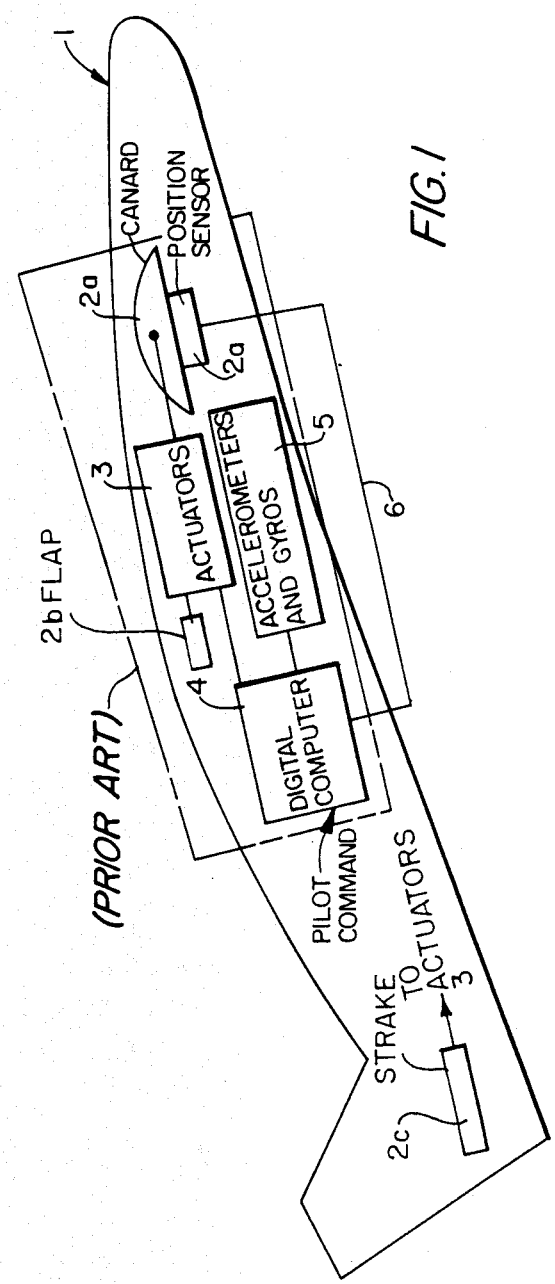
FIG. 1 is a schematic illustration of a canard-equipped aircraft incorporating a basic flight control system, shown in block diagram form.

FIG. 1 schematically illustrates an aircraft 1 having a control surface 2a, which may be a canard, a control surface 2b, which may be a wing flap and 2c, which may be a strake flap, such as employed in the X-29 jet aircraft. Actuators 3 variably position the control surfaces 2, 2b and 2c by conventional means. A flight control digital computer 4 of known design includes a number of inputs including a pilot command input and data inputs from accelerometers and gyros, collectively referred to by reference numeral 5. Thus far, the system described employs components and subsystems to achieve stability via multi-control surfaces. However, the illustrated system also incorporates position data from control surface 2a, which serves as an additional input 6 to digital computer 4 which performs a complementary filtering function, in order to obtain a synthetic pitch acceleration signal with minimum noise. The complementary filter is in accordance with co-pending application Ser. No. 797,089 now U.S. Pat. No. 4,697,768.

Figure 2:
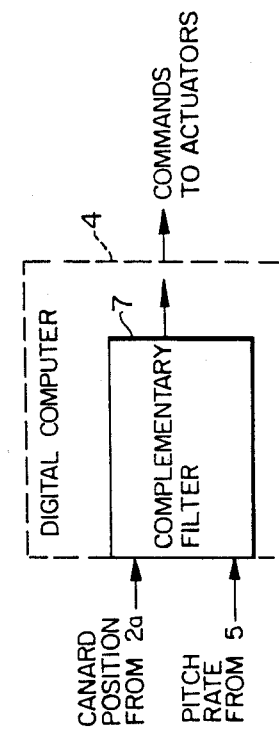
FIG. 2 is a schematic illustration of a complementary filter, incorporated in a flight control digital computer.

FIG. 2 is a basic schematic illustration of digital computer 4 which is seen to include the necessary memory and control for achieving the function of a complementary filter 7. By being provided with canard position data as well as pitch rate data, the complementary filter 7 estimates pitch acceleration; further, the filter simultaneously reduces flight control system noise and improves aircraft stability margins.

Figure 3:
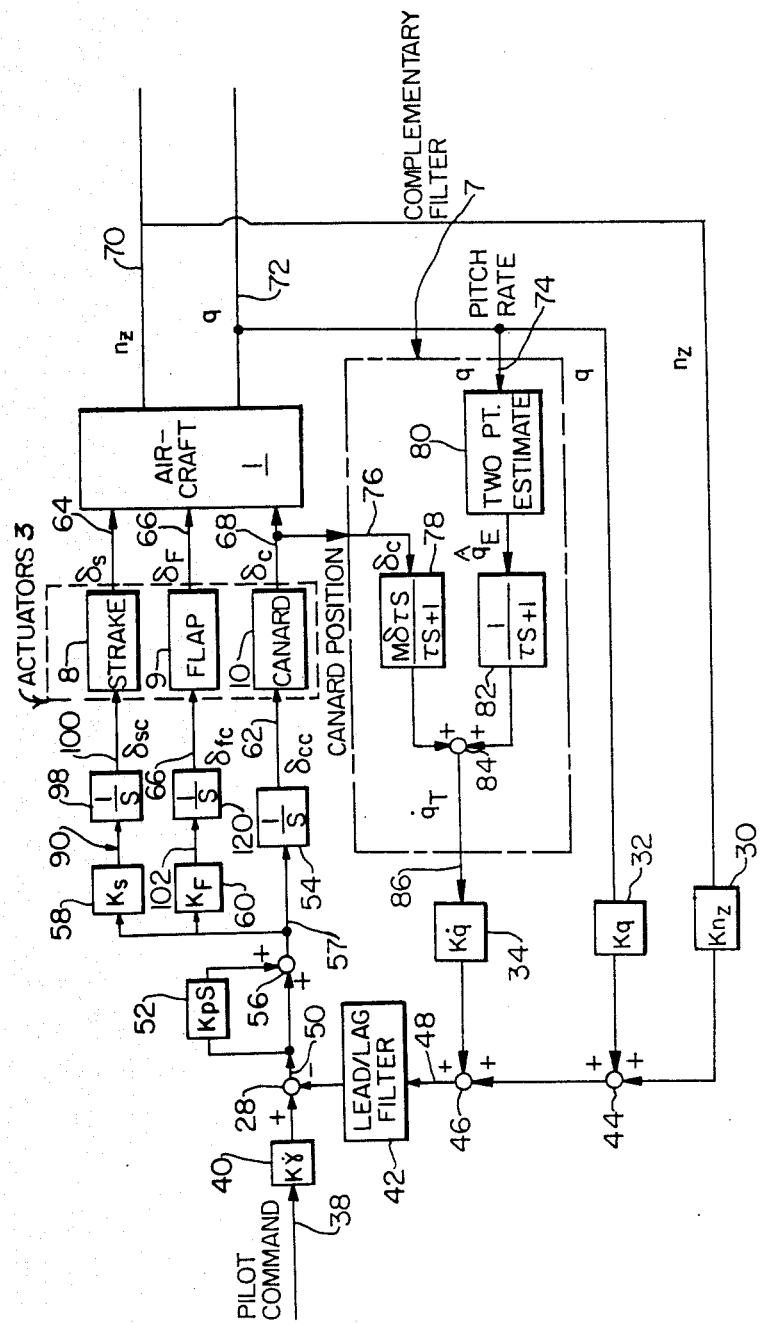
FIG. 3 is a block diagram of a flight control system incorporating a stability feedback loop.

An implementation of the aircraft stability feedback loop, utilizing three control surfaces, is illustrated in FIG. 3. The illustrated loop serves to maintain the aircraft in a stable mode, particularly when it encounters a serious perturbation, such as severe wind shifts. The flight control circuit illustrated drives a strake actuator 8, flap actuator 9, and canard actuator 10 of the aircraft 1, which is schematically illustrated in FIG. 1 and indicated as a block in FIG. 3. A pilot command signal on input line 38 is a pilot stick signal ($K_y$) which is multiplied in amplifier 40 by a gain. The resulting amplified signal is fed to difference point 28 where a number of feedback signals are subtracted from the amplified stick signal. These feedback signals include vertical acceleration $n_z$, which is detected along output line 70 of a conventional aircraft accelerometer (not shown) followed by amplification in amplifier 30 by a gain factor $K_{nz}$. This amplified vertical acceleration feedback signal is summed at point 44 with a pitch rate signal, the latter measured by a conventional aircraft gyroscope (not shown) and amplified at amplifier 32 by a gain $K_q$. A third feedback signal is provided from complementary filter 7 to summation point 46 where it is summed with the previously discussed feedback signals that were summed at point 44. Before being summed at point 46, this third feedback signal undergoes amplification in amplifier 34 by a gain $K_{\dot{q}}$. The total feedback signal 48 is fed into a lead/lag filter 42. The filter provides lead compensation to the control system to stabilize the aircraft. The filter signal is fed into the difference point 28. The error signal appearing at the output 50 undergoes a differentiation and an amplification by a gain $K_p$ 52. The output is summed with the error signal at 56. This signal goes to zero in steady state.

The resulting error signal is fed along line 57 in parallel to amplifiers 58 and 60 which respectively amplify the inputs thereto by gains $K_s$ and $K_f$. These signals are combined with the corresponding performance optimization loop signals at summations 92 and 104, respectively, in FIG. 4. The respective signals are integrated via integrators 98 and 120. The outputs from the integrators are signals which are used to drive the strake and flap actuators (8, 9), respectively. The error signal 57 is integrated via integrator 54, and the output 62 is used to drive the canard actuator 10. Thus, for a particular error signal present at summing point 56, individual gains are provided to the control surface actuators in order to maintain stability for aircraft 1. The actual gains may be empirically derived for a particular aircraft in accordance with well-known techniques.

The outputs from the strake, flap and canard actuators are respectively indicated by the angular quantities $\delta_S$, $\delta_F$ and $\delta_C$ existing on individual parallel actuator control lines 64, 66 and 68 to cause corresponding angular displacement of the control surfaces thereby varying the flight control characteristics for aircraft 1. As an aircraft changes its flight path, new vertical acceleration $n_z$ and pitch rate q occur and are fed back. The pitch rate q is not only fed back to the amplifier 32, but also forms the input to the complementary filter 7.

At the filter, the pitch rate signal from line 72 is connected to an input terminal 74 of a two-point estimator 80 which performs a well-known calculation to estimate pitch acceleration from pitch rate. This quantity is then fed to the input of a low pass filter 82 which basically attenuates the high frequency noisy signal.

Canard position data $\delta_C$ present on control line 68 is connected in parallel to the complementary filter 7 so as to form a second input thereto. This input is connected to a high-pass filter 78, via connection line 76. The high-pass filter has a gain $M_\delta$ which relates to a well-known flight control moment parameter. The complementary filter 7 is so named due to the fact that the low-pass filter 82 operates on pitch rate to provide pitch acceleration information in the low frequency range while the high-pass filtered canard deflection provides the complementary high frequency information. The time constants $\tau$ for filters 78 and 82 are chosen to achieve maximum stability margin and minimum noise.

The outputs from filters 78 and 82 are added at summing point 84 to form a filter output signal $\dot{q}_E$, along line 86, which is then input to the amplifier 34 resulting in an amplified feedback signal from the complementary filter which is added at summing point 46 to the other two feedback signals from summing point 44. The resultant feedback signal is connected via line 48 to the lead/lag filter 42, and then to point 28, where a total error signal is formed. The lead/lag filter compensates for system hardware lags.

Figure 4:
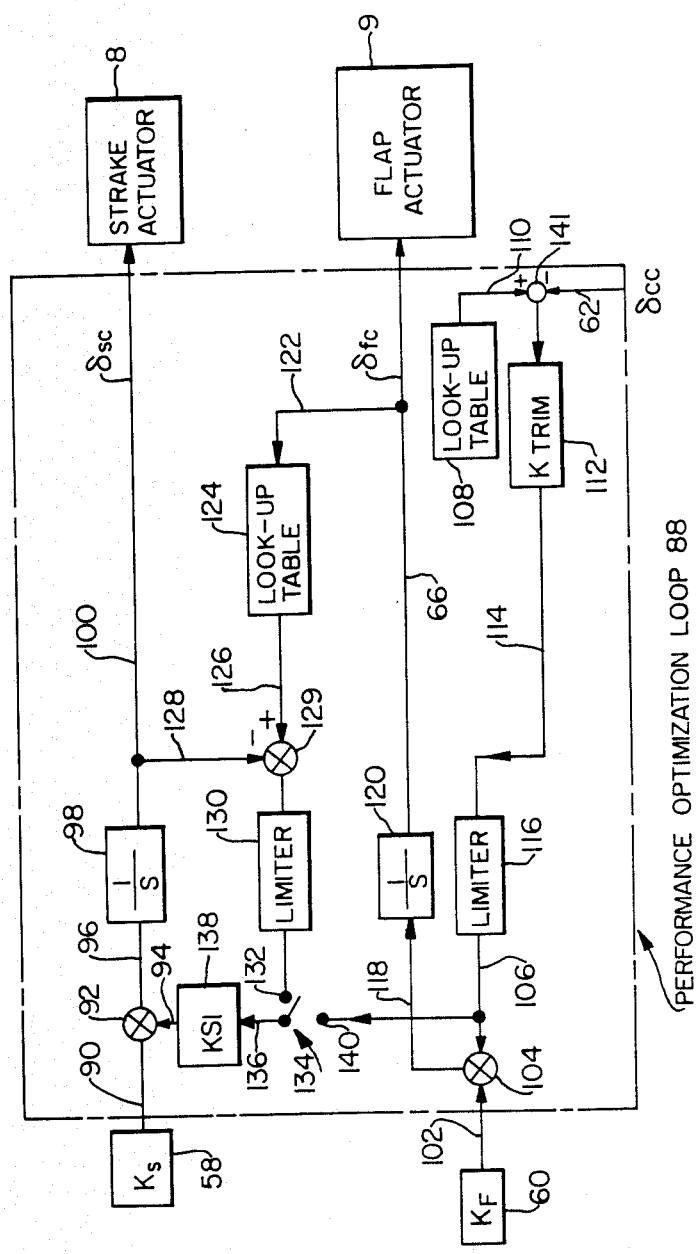
FIG. 4 is a block diagram of that portion of the flight control system which incorporates a performance optimization feedback loop.

FIG. 4 illustrates a block diagram for the performance optimization loop 88 which precisely positions the control surfaces of an aircraft after stability has been obtained by the loop of FIG. 3. Strake and flap signals undergoing gain amplification at 58 and 60 (common to the loop of FIG. 3) input parallel signals to the loop 88. The first strake signal from amplifier 58 is fed, along line 90, to a first input of summing point 92. The output from the summing point is fed, via line 96, to an integrator 98 which generates a strake command $\delta_{sc}$ on line 100 which is in turn introduced to strake actuator 8. The strake command during normal operation of an aircraft will include a stabilizing signal introduced to summing point 92 from amplifier 58. A performance component is introduced to the second input 94 of summing point 92.

In order to better appreciate how the signal at the second input 94 of summing point 92 is generated, continued reference to FIG. 4 is made.

The stabilizing signal developed from amplifier 60 (common with FIG. 3) is fed along line 102 to the performance optimization loop 88. There it is fed to a first input of summing point 104 and the output line 118 from the summing point 104 is connected to flap actuator 9 via integrator 120, the output of which is the flap actuator command $\delta_{fc}$. This command is connected in parallel along line 122 that serves as an input to a look-up table 124 which stores data as a function of Mach, altitude, and $\delta_{fc}$. Conventional altimeters and air speed sensor in aircraft 1 provide input data at each moment of time relative to Mach number and altitude. An output signal from table 124 will be generated along line 126 as a result of the three inter-related instantaneous parameters. The strake command for performance optimization along line 128 is compared with the total strake command at point 129. The error from the difference point 129 is serially fed to a limiter 130 which limits the swing of the signal output from the difference point 129 prior to further processing by the loop. The output from limiter 130 is connected to contacts 132 and 136 of a switch 134 which functions as a single pole, double throw switch. This switch normally resides in the illustrated position; but when the flaps of an aircraft are moved to a saturated, fully displaced position, switch 134 is changed to its other state so as to eliminate feedback from terminal 132. The strake signal for optimum performance 136 is amplified by the amplifier 138 and summed with the stability loop strake signal at summation point 92. The total signal 96 is passed through an integrator 98. The output 100 is the signal which drives the strake actuator 8.

The optimization loop 88 is activated by the canard command signal 62. This signal is compared with a reference canard position 110 at the difference point 141. The reference canard position comes from a look-up table 108, which is a function of Mach, altitude and angle of attack. The error signal from 141 undergoes amplification at amplifier 112. The output of the amplifier is connected via line 114 to a limiter 116 which limits the rate of change of the signal on line 114. The output from limiter 116 along line 106 is summed with the stability loop (FIG. 3) flap command signal 102 at summation point 104. This second input to the summing point is parallel connected to terminal 140 of switch 134 so that the signal generated as a result of look-up table 108 may be provided to switch 134 when the switch has been changed from the state illustrated, which occurs when the flaps of an aircraft are fully displaced to a saturated position, as previously explained. The output from switch 134 is connected along line 136 to amplifier 138, the output of which is connected along line 94 to the second input of summing point 92 thereby completing the performance optimization loop 88.

In operation of the loop shown in FIG. 4, the error signals to limiters 116 and 130 are driven to nulls as a result of continual updating of loop 88 by look-up tables 124 and 108. The flap and strake commands illustrated provide trim signals to the strake and flap actuators 8 and 9 to trim their positions after stability of the aircraft has been achieved so as to optimize performance of the aircraft.

It should be understood that the invention is not limited to the exact details of construction shown and described herein, for obvious modifications will occur to persons skilled in the art.

We claim:

1. In a flight control system for an aircraft having three control surfaces, interconnected feedback control loops for stabilizing and optimizing the performance of the aircraft, the stabilizing loop comprising:
    first means for summing signals representing pitch rate and vertical acceleration of the aircraft;
    complementary filter means connected at its input to the pitch rate signal and a canard position signal for filtering these signals together to form a combined signal thereby reducing signal noise;
    second means for summing the combined signal and an output signal from the first summing means;
    filter means connected at its input to the output of the second summing means for providing lead compensation of the signal resulting at the output of the second summing means thus providing a lead compensated signal;
    means for obtaining an error signal between the lead compensated signal and a pilot command input signal; and
    parallel means distributing the error signal as respective stabilization error signals for the three controlled surfaces;
    means for integrating the stabilization error signal; and
    means for connecting the stabilization error signals to actuators of corresponding control surfaces.

2. The system set forth in claim 1 together with a performance loop comprising:
    a first look-up table for generating a first look-up signal dependent upon Mach number, altitude and angle of attack;
    first subtracting means for subtracting a third surface command signal from the first look-up signal;
    first summing means for summing the resulting subtracted signal with a third surface rate stabilization error signal to form a summed signal;
    first integrating means for integrating the summed signal to form a first surface command signal;
    means connecting the first command signal to a first actuator for repositioning a first control surface;
    second look-up table means having an input thereof connected to the first surface command signal for generating a second look-up signal dependent upon Mach number, altitude and the first surface contro signal;
    second means for summing the second look-up table signal and a second surface rate stabilization error signal;
    second means for integrating the second summed signal to form a second surface command signal; and
    means connecting the second command signal to a second actuator for repositioning a second control surface;
    wherein the performance loop predominates system operation when two of the preselected parallel distributed error signals are zero, thereby indicating stable operation.

3. The system set forth in claim 2 wherein the three control surfaces are canard, flap and strake surfaces, and further wherein the two preselected parallel distributed error signals are those corresponding to strake and flap surfaces.

4. In a flight control system for an aircraft having three control surfaces, interconnected feedback control loops for stabilizing and optimizing performance of the aircraft, the performance loop comprising:
    a first look-up table for generating a first look-up signal dependent upon Mach number, altitude and angle of attack;
    first subtracting means for subtracting a third surface command signal from the first look-up signal;
    first summing means for summing the resulting subtracted signal with a first surface rate stabilization error signal to form a summed signal;
    first integrating means for integrating the summed signal to form a first surface command signal;
    means connecting the first command signal to a first actuator for repositioning a first control surface;
    second look-up table means having an input thereof connected to the first surface command signal for generating a second look-up signal dependent upon Mach number, altitude and the first surface control signal;
    second summing means for summing the second look-up table signal and a second surface rate stabilization error signal;
    second integrating means for integrating the second summed signal to form a second surface command signal; and
    means connecting the second command signal to a second actuator for repositioning a second control surface.

5. The system set forth in claim 4 together with a second subtracting means having a first input connected to the output of the second look-up table and further having a second input connected to the output of the second integrating means;
    means for limiting the value range of the second look-up signal having its input connected to the output of the second subtracting means; and
    means for connecting the limiting means output to a second input of the second summing means for establishing a feedback loop through the limiting means.

6. The system set forth in claim 5 wherein the first control surface is an aircraft flap.

7. The system set forth in claim 5 wherein the second surface is an aircraft strake.

8. The system set forth in claim 5 wherein the first surface is an aircraft flap and the second surface is an aircraft strake.

9. The system set forth in claim 8 together with means connected with the output of the first subtracting means for limiting the swing of the first look-up signal.

10. The system set forth in claim 5 together with switching means, responsive to displacement of the first control surface to an extreme position, for switching an input of the second summing means from the limiting means output to the first look-up signal.

* * * * *

UNITED STATES PATENT AND TRADEMARK OFFICE
CERTIFICATE OF CORRECTION

PATENT NO.   :   4,797,829

DATED        :   January 10, 1989

INVENTOR(S)  :   Romeo P. Martorella, et al.

It is certified that error appears in the above-identified patent and that said Letters Patent is hereby corrected as shown below:

Column 5, line 64, change "contro" to --control--.

Signed and Sealed this

Sixth Day of June, 1989

*Attest:*

DONALD J. QUIGG

*Attesting Officer*   *Commissioner of Patents and Trademarks*